United States Patent Office 3,113,146
Patented Dec. 3, 1963

3,113,146
ISOCYANATES CONTAINING SILICON
Harold Crosbie Fielding and John Maclelland Pollock, both of Northwich, England, assignors to Imperial Chemical Industries Limited, London, England, a corporation of Great Britain
No Drawing. Filed May 1, 1961, Ser. No. 106,500
Claims priority, application Great Britain May 9, 1960
5 Claims. (Cl. 260—448.8)

This invention relates to a process for making novel isocyanates containing inorganic atoms of elements that form covalent isocyanates, particularly silicon and phosphorus.

According to our invention we provide a process for making novel isocyanates containing inorganic atoms comprising reacting under substantially moisture-free conditions a covalent inorganic isocyanate, which may be substituted with organic groups, with an alkylene oxide, in the presence, if desired, of a basic catalyst for example a tertiary amine.

By covalent inorganic isocyanates are understood compounds having formulae included among the general types $M(NCO)_x$, $OM(NCO)_x$, $(R)_nM(NCO)_{x-n}$ and $(RO)_nM(NCO)_{x-n}$ wherein M represents an element other than carbon that forms covalent halides, for example phosphorus, silicon, tin, arsenic, antimony, boron, and $x$ is its valency, R represents an alkyl, aryl or alkylaryl group which may be substituted, and $n$ is an integer not greater than $(x-1)$. Examples of these covalent inorganic isocyanates are $P(NCO)_3$—phosphorus triisocyanate
$OP(NCO)_3$—Phosphoryl triisocyanate
$EtP(NCO)_2$—ethyl phosphorus diisocyanate
$Si(NCO)_4$—silicon tetraisocyanate
$(EtO)_2Si(NCO)_2$—diethoxy silicon diisocyanate The alkylene oxides with which these covalent inorganic isocyanates react to give the novel isocyanates of the invention have the general formula

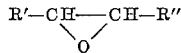

wherein R, R″ may be alkyl, aryl or arylalkyl groups, which may be substituted; or R′, R″ may be hydrogen or may together be part of the same cycloalkyl ring. Examples of these alkylene oxides are ethylene oxide, propylene oxide, styrene oxide, cyclohexene oxide, isobutene oxide, camphene oxide, phenyl glycide ether, linseed oil epoxide.

The novel isocyanates of the invention have formulae among the general types

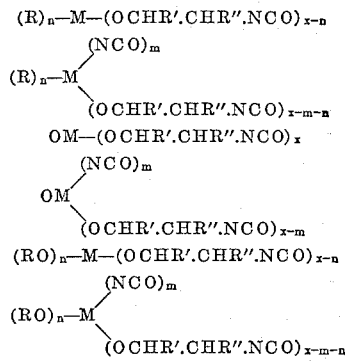

wherein R, R′, R″, M and $x$ have the meanings hereinbefore defined, and $n$ and $m$ are integers or zero and $(m+n)$ is not greater than $(x-1)$.

Examples of these novel isocyanates are:

$Si(OCH_2.CH_2.NCO)_4$
tetra(2-isocyanatoethoxy)silane $(C_2H_5O)_2Si(OCH_2.CH_2.NCO)_2$
diethoxy bis(2-isocyanatoethoxy)silane $OCN.Si(OCH_2.CH_2.NCO)_3$
tris(2-isocyanatoethoxy)silicon monoisocyanate

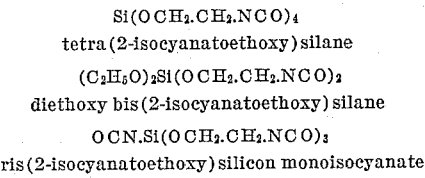
bis(2-isocyanatoethoxy)phosphorus monoisocyanate

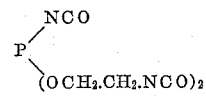
ethyl-2-isocyanatoethoxy phosphorus monoisocyanate

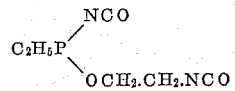
bis(2-isocyanatoethoxy)phosphoryl monoisocyanate

The process of the invention is conveniently carried out by allowing the covalent inorganic isocyanate and alkylene oxide to react together in a closed vessel, in the absence of moisture, at a temperature between about 0° and 200° C., and under pressure if the boiling point of either reactant is much below the desired reaction temperature. The pressure, if required, is usually less than 100 atmospheres and may be as little as one atmosphere. The reactions are catalysed by basic catalysts for example triethylamine, tri-n-butylamine, a suitable proportion of which is about 0.50% by weight of the combined weight of reactants.

The products of the invention are useful intermediates. For example they react, as do organic isocyanates such as toluylene diisocyanate, with alcohols, amines, glycols, glycerol, polyesters and polyamines to give polymeric products. They can also homopolymerise to give in some cases hard resins. They thus constitute and intermediate class of isocyanates whose properties can be regulated to suit different applications.

The following examples illustrate but do not restrict the invention.

Example 1

Under conditions to exclude moisture 213 g. of phosphorus triisocyanate was stirred at 20° C. and gaseous ethylene oxide was bubbled through the liquid until the increase in weight was 180 g. The mixture was allowed to stand for 24 hours, during which time it set to a gel. This was treated with chloroform and became solid. The solid was collected on a filter, washed with chloroform and dried, giving 60 g. of bis(2-isocyanatoethoxy) phosphorus monoisocyanate.

Found: P, 12.3%; N, 16.5%. Calculated for OCN—P(OCH$_2$.CH$_2$.NCO)$_2$: P, 12.6%; N, 17.1%.

Example 2

20 g. silicon tetraisocyanate and 40 g. ethylene oxide were mixed in a pressure vessel and heated to 100° C. for 4 hours under autogenous pressure of about 30 atmospheres. The product was then transferred to a distillation apparatus and distilled under vacuum. After unreacted ethylene oxide had been removed, the liquid was heated at 80° C. at 3 mms. for ½ hour to ensure complete removal of excess Si(NCO)$_4$. The product remaining was approximately 30 g. of a viscous liquid, which rapidly solidified on exposure to the atmosphere. An infra-red spectrum, taken as rapidly as possible with minimum exposure to the atmosphere showed that the product contained isocyanate groups. Analysis gave C, 35.4%; H, 3.5%; N, 16.4%; SiO$_2$, 19.2%. This corresponds to OCN—Si(—O.CH$_2$.CH$_2$.NCO)$_3$ for which the theoretical analysis is: C, 36.6%; H, 3.7%; N, 17.0%; SiO$_2$, 18.3%.

*Example 3*

20 g. silicon tetraisocyanate was added at room temperature to 60 g. styrene oxide in a flask fitted with a reflux condenser and protected from entry of atmospheric moisture. The mixture was heated to 100° C. at which a reaction began to take place and continued for 40 minutes at the end of which an orange-yellow resin was formed. At room temperature this was flexible and further heating at 110° C. for 24 hours did not increase its hardness.

*Example 4*

78 g. silicon tetraisocyanate and 117 g. propylene oxide and 1 g. triethylamine were mixed in a flask fitted with a guard-tube containing calcium sulphate at 20° C. After 4 hours the mixture had become viscous and on being subjected to vacuum to remove volatile materials a sticky gel remained. This on analysis showed C, 44.0%; H, 6.8%; N, 11.1%; SiO$_2$, 12.4%; and infra-red absorption analysis indicated the presence of isocyanate groups (4.4μ) and some carbonyl groups (5.8μ).

The gel was poured into a mould to give a flat sheet 6 inches square by ¼ inch thick. The mould was sealed against entry of atmospheric moisture and allowed to stand for 3 days. At the end of this time the contents had polymerised to a hard, pale yellow resin which after curing for 24 hours at 100° C. had a Vicat hardness of 18.1. Analysis showed C, 41.1%; H, 6.2%; N, 11.8%; SiO$_2$, 13.4%. The theoretical analysis for a 1 to 4 molar adduct of silicon tetraisocyanate and propylene oxide is C, 44.5%; H, 5.6%; N, 13.0%; SiO$_2$, 14.0%.

What we claim is:

1. Process for making isocyanates containing silicon atoms comprising reacting under substantially moisture-free conditions silicon tetra-isocyanate with an alkylene oxide chosen from the group consisting of ethylene oxide, propylene oxide and styrene oxide.

2. Process as claimed in claim 1 in which the reaction temperature is between about 0° C. and 200° C. and the reaction pressure is between atmospheric and 100 atmospheres.

3. Process as claimed in claim 1 in which a tertiary amine is used as catalyst.

4. An isocyanate containing silicon and having the formula

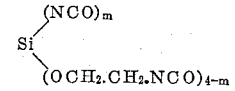

in which *m* is an integer from 1 to 3.

5. An isocyanate containing silicon and having the formula

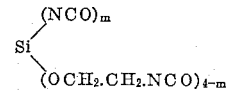

in which *m* is an integer from 1 to 3 and R is an organic radical chosen from the group consisting of methyl and phenyl.

References Cited in the file of this patent

UNITED STATES PATENTS

| | | |
|---|---|---|
| 2,650,934 | Rust et al. | Sept. 1, 1953 |
| 2,835,652 | Haven | May 20, 1958 |
| 3,013,048 | Holtschmidt | Dec. 12, 1961 |

FOREIGN PATENTS

| | | |
|---|---|---|
| 1,066,582 | Germany | Oct. 8, 1959 |

OTHER REFERENCES

Eaborn, "Organosilicon Compounds," Academic Press, Inc., New York, publishers (1960), pages 219–26.